United States Patent [19]

Schrijvers et al.

[11] 4,213,055

[45] Jul. 15, 1980

[54] IMAGE INTENSIFIER TUBE

[75] Inventors: Joost E. Schrijvers; Martinus W. A. Boers, both of Eindhoven, Netherlands

[73] Assignee: U.S. Philips Corporation, New York, N.Y.

[21] Appl. No.: 949,551

[22] Filed: Oct. 10, 1978

[30] Foreign Application Priority Data

Oct. 24, 1977 [NL] Netherlands ........................ 7711633

[51] Int. Cl.2 .......................... G01T 1/00; H01J 31/50

[52] U.S. Cl. .............................. 250/483; 250/213 VT

[58] Field of Search ........ 250/460, 483, 486, 213 VT, 250/487, 488, 397

[56] References Cited

U.S. PATENT DOCUMENTS

| | | | |
|---|---|---|---|
| 2,666,864 | 1/1954 | Longini | 250/213 VT |
| 2,708,250 | 5/1955 | Day | 250/213 VT |
| 2,757,293 | 7/1956 | Teves et al. | 250/213 VT |
| 3,303,245 | 2/1967 | Wulms | 250/213 VT |
| 3,825,763 | 7/1974 | Cornelis et al. | 250/486 |
| 3,838,273 | 9/1974 | Cusano | 250/486 |
| 4,140,900 | 2/1979 | Wang | 250/213 VT |

*Primary Examiner*—Bruce C. Anderson

*Attorney, Agent, or Firm*—Marc D. Schechter

[57] ABSTRACT

In order to achieve a strong and safe construction, the tube wall of an image intensifier tube is provided with at least two comparatively heavy supporting rings. On one of these rings a cup-shaped or spherical, vacuum-tight sealing entrance window of X-ray transparent metal is secured. As a result of the use of an adapted electrode construction and a concave exit screen, the length of the tube is smaller than 1.5 times the effective diameter of the entrance screen.

13 Claims, 1 Drawing Figure

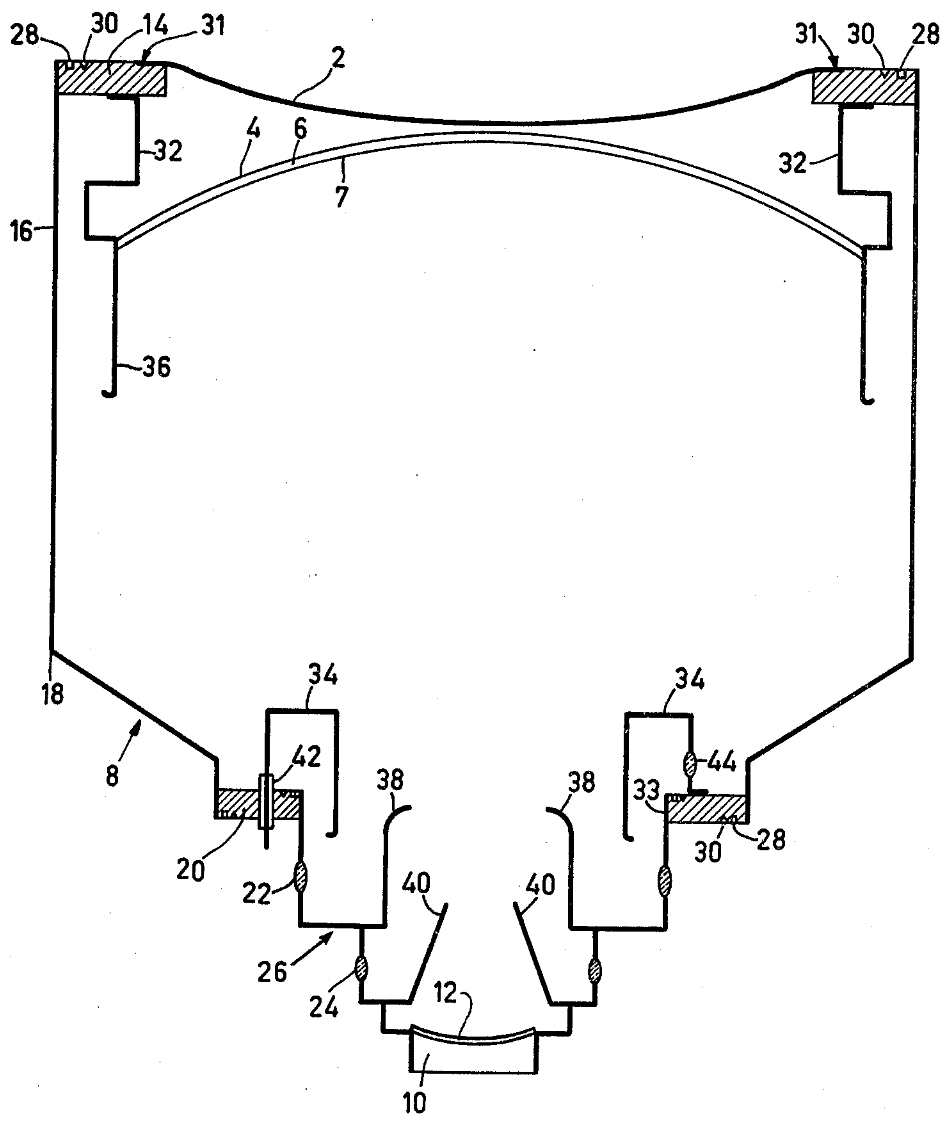
28
30
14
31
2
31
30
28
32
4
6
7
32
16
36
18
8
34
42
38
20
22
26
24
40
12
10
34
44
38
33
30
28
40

IMAGE INTENSIFIER TUBE

BACKGROUND OF THE INVENTION

The invention relates to an image intensifier tube, comprising an envelope consisting of a jacket, a metal entrance window, and an exit window, said envelope accommodating an electron-optical system for imaging electrons, emerging from an entrance detection screen, on an exit screen.

An image intensifier tube of this kind is known, in the form of an X-ray image intensifier tube, from German Offenlegungsschrift No. 2513894 (Siemens, Sept. 30, 1976). The tube described therein is susceptible, notably during mounting activities, to, for example, damage caused by tools to be used and by jolting of the tube against hard objects, so that the tube is liable to implode in unfavorable circumstances. This risk is higher as the diameter of the entrance screen of the tube, and hence the volume of the tube, is made larger. A heavier construction of the entrance screen results in a lower quantum detection efficiency, and hence in a loss of sensitivity and a less favorable signal-to-noise ratio. A heavier construction of the jacket of the tube readily results in a very heavy tube which is difficult to handle.

SUMMARY OF THE INVENTION

An object of the invention is to increase the diameter of the entrance screen of an image intensifier tube, without increasing the likelihood of damaging the tube and without substantially affecting the sensitivity or the signal-to-loss ratio. To this end, an image intensifier tube according to the invention includes an envelope which is provided with at least two reinforcements in the form of supporting rings, one of which is situated near the entrance window and is connected thereto in a vacuum-tight manner, while a second ring is situated between the first one and the exit window. It has been found that an image intensifier tube, having a construction including the supporting rings, is very resistant to damage to the entrance screen as well as to jolting of the entrance screen or the jacket, even when a comparatively large entrance screen is used. The risk of implosion of the tube in the case of such damage is thus substantially reduced, while the high X-ray transmission of the entrance window is maintained.

In a preferred embodiment, the entrance window is formed by a foil which is concave on the outer side and behind which an entrance detection screen is mounted. The edge of the cup-shaped, sealing foil is connected vacuum-tight to the jacket of the tube, preferably via the supporting ring. A second supporting ring is preferably situated, viewed in the axial direction of the tube, between a first reduced portion of the tube wall and the exit window. The exit window preferably consists of a fiber optical plate having an entrance face which is concave on the inner side.

BRIEF DESCRIPTION OF THE INVENTION

Some preferred embodiments according to the invention will be described in detail hereinafter with reference to the accompanying diagrammatic drawing. The drawing is a sectional view of an X-ray image intensifier tube according to the invention, comprising a comparatively large concave entrance window.

DESCRIPTION OF THE PREFERRED EMBODIMENTS

An X-ray image intensifier tube as shown in the drawing comprises an entrance window 2, preferably in the form of a scaling metal foil, and an entrance detection screen 4, comprising a luminescent screen 6. The luminescent screen 6 is, for example, of the type described in U.S. Pat. No. 3,825,763, the luminescent material being for example, CsI:Na. Preferably using a separating layer, a photocathode 7 is provided on the inner side of the luminescent screen 6. The envelope of the tube comprises, besides the entrance window 2, a jacket 8 and an exit window 10 which is provided on the inner side with an electron-sensitive luminescent exit screen 12. Exit window 10 is, in this case, constructed as a fiber optical window having a concave inner surface. The jacket 8 comprises a first supporting ring 14 to which the entrance window 2 and a jacket portion 16 are connected vacuum-tight. The jacket portion 16 is connected to a second supporting ring 20 via a reduced portion 18. Between the supporting ring 20 and the exit window 10 there is situated a jacket portion 26 which is insulated by insulating rings 22 and 24. The supporting rings are made of, for example, fernico, chromium nickel steel, molybdenum or similar materials having a comparatively high rigidity. The entrance window 2 is connected to the ring 14, for example, by way of a welded or soldered connection, and consists of, for example, titanium foil having a thickness of from approximately 0.25 to 0.5 mm in this preferred embodiment. The radius of curvature of the entrance window 2 then amounts to, for example, from 0.5 to 1.0 meters. In the supporting ring 14, having a section of, for example, 1.0×3.5 cm for a tube having an entrance window of at least 36 cm, there is provided an expansion groove 28 in order to compensate for deformations incurred during the soldering or welding and evacuation of the tube. A groove 30 serves as a guide groove for welding the entrance foil and the jacket portions to the rings. Due to the evacuation of the tube, the ring 14 is slightly deformed, with the result that an outer surface 31 is inclined inwards towards the mechanical longitudinal axis of the tube. By means of connections 32, the entrance detection screen 4 is suspended from the ring 14, electrically insulated or not. Behind the reduced portion 18, the jacket portion 26 is connected to the second supporting ring 20. This second supporting ring has a construction which strongly resembles that of the first ring, with the exception of the reduced diameter. On an inner side 33 of this ring there is connected one end of the jacket portion 26, which supports the exit window 10 on its other end. The supporting ring 20 acts as a support for a part of the electron-optical system of the tube. An electrode 34 thereof is directly connected to the ring 20, by way of an electrically insulating bush 42. The ring 20 is preferably also provided with an expansion groove 28 and a guide groove 30.

An electron-optical system is diagrammatically shown and includes photocathode 7 (which preferably includes a sleeve 36), the electrode 34, an intermediate electrode 38 and an anode 40. The electron-optical system images electrons, emerging from the photocathode, on the luminescent screen 12 of the exit window 10. By variation of the potential of notably the electrode 38, a zoom effect as described in the U.S. Pat. No. 3,303,345 can be realized, an entrance image of in this case at the most approximately 36 cm or smaller then being displayed on the exit screen 12 in a focussed manner. By a suitable choice of the various potentials, the shape and the curvature of the photocathode 7 and the exit screen 12, and the shape of and the distance between the electrodes, it can be ensured that an optimum focussed image can be formed on the entire useful exit screen 12 for a plurality of dimensions of an entrance image, for example, 18, 25 and 36 cm. The construction of the electron-optical system also ensures that the total axial dimension of the tube will allow the exchange of a tube according to the invention for a prior art tube in customary X-ray examining devices. As a result, 36 cm tubes according to the invention can also be incorporated in systems presently using 23 cm tubes, only small adaptations then being required. The entrance window 2 in a preferred embodiment is connected to the supporting ring 14 by way of spot welding. Experiments have shown that such a welded joint is properly vacuum-tight if, for example, chromium nickel steel of the ring is directly connected to the titanium of the foil.

In a further preferred embodiment, the supporting ring 14 in the vicinity of the entrance window 2 is formed by a local reinforcement of the jacket 8 of the tube. As a result, it is only necessary to connect the entrance window 2 to the supporting ring 14 and, if desired, a gradual transition can be realized between the supporting ring 14 and the jacket 8. The supporting ring 20 which is situated in the vicinity of the exit window 10 can also be made integral with the jacket 8, but in a tube comprising a first supporting ring 14 as described herein, it may also be advantageous to construct the second supporting ring 20 to be separate. This ring 20 may then be used as a supporting ring and as a reference for various electrodes of the electron-optical system. In a preferred embodiment of an image intensifier tube according to the invention, notably being suitable for tubes having small entrance windows and having a first supporting ring which is made of a locally reinforced jacket material, for example, aluminium, use is made of an entrance window which is convex for incident radiation. After evacuation, the supporting ring is then subjected to an outwards directed compression force. Similarly, the second supporting ring may also be made of a locally reinforced jacket material.

In a further preferred embodiment, the luminescent screen and the photocathode are provided directly on the entrance window of the tube, so that the overall thickness of the material to be traversed by the image radiation can be reduced. The luminescent screen can be constructed to be at least substantially flat in a tube having a convex entrance screen, as well as in a tube having an additional supporting screen for the luminescent screen. For the window material, use can also be made of carbon fiber foil, pyrolytic graphite, or other metal-like foil having a comparatively high rigidity. As used here, the term "metal-like foil" means a foil made of a material having a high rigidity, similar to metal foils of titanium and aluminum.

What is claimed is:

1. An image intensifier tube comprising:

an envelope which includes a jacket, a metal foil entrance window, and an exit window;

an entrance detection screen, mounted in the envelope adjacent to the entrance window;

an exit screen, mounted in the envelope adjacent to the exit window;

an electron-optical system mounted in said envelope for imaging electrons, emerging from the entrance detection screen, on the exit screen;

wherein the envelope is provided with at least one reinforcement in the form of a supporting ring connected to the entrance window and to the jacket in a vacuum-tight manner.

2. An image intensifier tube, as claimed in claim 1, wherein the envelope is further provided with a second reinforcement in the form of a supporting ring connected to the jacket between the first ring and the exit window.

3. An image intensifier tube comprising:

an envelope which includes a jacket, a foil entrance window, and an exit window;

an entrance detection screen, mounted in the envelope adjacent to the entrance window;

an exit screen, mounted in the envelope adjacent to the exit window;

an electron-optical system mounted in said envelope for imaging electrons, emerging from the entrance detection screen, on the exit screen;

wherein the envelope is provided with at least one reinforcement in the form of a supporting ring connected to the entrance window and to the jacket in a vacuum-tight manner.

4. An image intensifier tube as claimed in claim 3, wherein the foil entrance window comprises a metal-like material having a high rigidity.

5. An image intensifier tube as claimed in claim 4, wherein the foil entrance window comprises carbon fiber foil or pyrolytic graphite.

6. An image intensifier tube, as claimed in claim 1, 2 or 5, wherein the foil entrance window has a diameter of approximately 36 cm, and an X-ray transmission of at least 85% for the wavelengths of the radiation used in medical X-ray diagnosis.

7. An image intensifier tube, as claimed in claim 1, 2, or 5, wherein the entrance window consists of a foil having a concave entrance face, the entrance detection screen being provided on a metal support which is arranged in the tube and which screen has a convex plane of incidence for the incident radiation.

8. An image intensifier tube, as claimed in claim 1, 2 or 5, wherein the supporting rings are formed by local reinforcements of the jacket of the tube.

9. An image intensifier tube, as claimed in claim 1 or 2, wherein the supporting ring which is situated in the vicinity of the entrance window consists of chromium nickel steel, and wherein the entrance foil is titanium and is connected to the ring by spot welding.

10. An image intensifier tube, as claimed in claim 1, 2 or 5, wherein the exit window has a concave inner surface.

11. An image intensifier tube, as claimed in claim 1, 2 or 5, wherein the tube has an optical axis and measured along the optical axis of the tube the distance between the entrance detection screen and the exit screen is less than 1.5 times the diameter of the entrance detection screen.

12. An image intensifier tube, as claimed in claim 1 or 2, wherein the entrance detection screen is provided directly on the entrance window, the window being made of materials having a high rigidity and a high X-ray transmission, such as aluminum and titanium.

13. An image intensifier tube, as claimed in claim 1, 2 or 5, wherein the entrance detection screen forms a substantially flat plane.

* * * * *